United States Patent [19]
Robinson

[11] Patent Number: 5,427,424
[45] Date of Patent: Jun. 27, 1995

[54] SINGLE HANDLE POST HOLE DIGGER

[76] Inventor: John A. Robinson, 1875 Village Ct., Thousand Oaks, Calif. 91362

[21] Appl. No.: 269,136
[22] Filed: Jun. 30, 1994
[51] Int. Cl.6 .............................................. A01B 1/18
[52] U.S. Cl. ................................................. 294/50.9
[58] Field of Search ........................... 294/50.5–50.9, 294/53.5, 57; 111/92, 101, 106

[56] References Cited
U.S. PATENT DOCUMENTS

| | | | |
|---|---|---|---|
| 281,193 | 7/1883 | Kohler | 294/50.9 |
| 819,791 | 5/1906 | Neste | 294/50.9 |
| 856,066 | 6/1907 | Jenney | 294/50.9 |
| 1,428,202 | 9/1922 | Arndt | 294/50.9 |

Primary Examiner—Johnny D. Cherry

[57] ABSTRACT

Disclosed is a new single handle post hole digger for excavating a constant diameter shaft in the ground for setting fence posts and the like. The single handle post hole digger comprises a stationary arcuate shovel blade pivotally connected to a movable arcuate shovel blade. The movable blade has an earth piercing position wherein the movable blade lies parallel to the stationary blade such that the extended arcs of the blades describe a cylinder. The movable blade also has an earth removing position wherein the lower edge of the movable blade is angled inwardly toward the stationary blade to define a scoop. An elongated gripping handle extends longitudinally from the blades. Blade control is accomplished with an actuator lever, pivotally mounted on the gripping handle, connected to the movable shovel blade by a control rod. Moving the lever in one direction positions the movable blade for earth piercing whereas moving the lever in the other direction positions the movable blade for earth removing.

1 Claim, 4 Drawing Sheets

SINGLE HANDLE POST HOLE DIGGER

BACKGROUND OF THE INVENTION

1. Field of the Invention

The present invention relates to post hole diggers and more particularly pertains to a single handle post hole digger which may be adapted for excavating a constant diameter shaft in the ground for setting fence posts and the like.

2. Description of the Prior Art

The use of post hole diggers is known in the prior art. More specifically, post hole diggers heretofore devised and utilized for the purpose of forming a hole in the ground for setting posts are known to consist basically of familiar, expected and obvious structural configurations, notwithstanding the myriad of designs encompassed by the crowded prior art which has been developed for the fulfillment of countless objectives and requirements.

The present invention is directed to improving devices for forming a hole in the ground for setting posts in a manner which is safe, secure, economical and aesthetically pleasing.

U.S. Pat. No. 5,209,534 to Crenshaw et al. describes a take-apart post hole digging tool. The device disclosed, while providing a way to form a constant diameter shaft, is useful only in soil types that can be made to stick to the blade by wetting. This invention does not include a way to grip the soil being removed from the hole.

The prior art also discloses post hole diggers as shown in U.S. Pat. No. 5,273,331 to Burnham, U.S. Pat. No. 4,042,270 to Weiland, and U.S. Patent Des. No. 311,853 to Stormsgaard. A shovel-like, digging, scooping and transporting apparatus is disclosed in U.S. Pat. No. 4,778,211 to Gabriel. While these devices fulfill their respective, particular objectives and requirements, the aforementioned patents do not disclose a single handle post hole digger for excavating a constant diameter shaft in the ground for setting fence posts and the like.

In this respect, the single handle post hole digger according to the present invention substantially departs from the conventional concepts and designs of the prior art, and in so doing provides an apparatus primarily developed for the purpose of excavating a constant diameter shaft in the ground for setting fence posts and the like.

Therefore, it can be appreciated that there exists a continuing need for a new single handle post hole digger which can be used for excavating a constant diameter shaft in the ground for setting fence posts and the like. In this regard, the present invention substantially fulfills this need.

As illustrated by the background art, efforts are continuously being made in an attempt to develop devices for forming a hole in the ground for setting posts. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of post hole diggers now present in the prior art, the present invention provides a new post hole diggers construction wherein the same can be utilized for excavating a constant diameter shaft in the ground for setting fence posts and the like. As such, the general purpose of the present invention, which will be described subsequently in greater detail, is to provide a new single handle post hole digger apparatus and method which has all the advantages of the prior art post hole diggers and none of the disadvantages.

The invention is defined by the appended claims with the specific embodiment shown in the attached drawings. For the purpose of summarizing the invention, the invention may be incorporated into a new single handle post hole digger for excavating a constant diameter shaft in the ground for setting fence posts and the like. The single handle post hole digger comprises a stationary steel shovel blade having an arcuate cross section, a cutting edge formed on a lower end thereof, and straight side edges. The stationary blade also has a connecting bracket with an upwardly opening integrally formed socket fixedly attached to an interior side thereof, the socket having a wall with a longitudinal opening extending the length thereof. The socket also has a solid bottom with an exposed edge portion at the wall opening defining a first abutment. The socket is eccentrically positioned relative to the arc of the blade.

The connecting bracket further has a pair of integrally formed parallel laterally spaced apart support arms projecting therefrom. Each support arm has a lateral hole formed proximal a free end thereof, each hole aligning with the hole through the corresponding support arm.

A movable steel shovel blade has a shape and dimension essentially corresponding to the shape and dimension of the stationary blade. The movable blade has an earth piercing position wherein the movable blade lies in spaced parallel facing relationship to the stationary blade such that the extended arcs of the blades describe a cylinder. The movable blade also has an earth removing position wherein the lower edge of the movable blade is angled inwardly toward the stationary blade to define a scoop.

The movable blade additionally has a pair of parallel laterally spaced apart pivot arms projecting from an interior side thereof, each pivot arm lying adjacent a connecting bracket support arm. Each pivot arm has a lateral pivot hole therethrough aligning with the hole through the adjacent support arm. Each pivot arm further has an integrally formed lever arm projecting longitudinally therefrom, each lever arm having a lateral connecting hole formed proximal a free end thereof. The connecting holes have a connecting pin extending therethrough, the connecting pin being secured with a swage on both ends thereof.

Each pivot arm additionally has an integrally formed upwardly extending protrusion thereon defining, in combination, a second abutment. The second abutment contacts the first abutment when the shovel blades are in the earth piercing position whereby establishing optimal blade alignment for earth piercing and simultaneously adding rigidity to the movable blade during an earth piercing operation.

A pivot pin extends through the holes of the support arms. The pivot pin also extends through the pivot holes of the pivot arms whereby pivotally connecting the movable shovel blade to the stationary shovel blade such to permit the blades to move between the earth piercing and earth removing positions, The pivot pin is secured with a swage on both ends thereof.

An elongated wood gripping handle has first and second ends, The second end of the gripping handle fixedly engages the socket such that the blades form a longitudinal extension of the handle, The handle is eccentrically positioned proximal the stationary blade within the circle described by the extended arcs of the blades whereby the stationary blade will bear the majority of stress resulting from the earth piercing operation.

Blade control means pivots the movable blade between the earth piercing and earth removing positions, The blade control means comprises an actuator lever pivotally connected at a first end thereof proximal the first end of the gripping handle such that the actuator lever moves through an arc lying on a longitudinal plane of the handle. A control rod is pivotally connected at a first end thereof to the actuator lever intermediate the first end and a second end thereof, The control rod is pivotally connected at a second end thereof to the connecting pin of the movable blade whereby pushing the actuator lever downwardly toward the blades causes the movable blade to pivot parallel to the stationary blade in the earth piercing position, Pulling the actuator lever upwardly toward the first end of the gripping handle causes the lower end of the movable blade to pivot inward toward the stationary blade in the earth removing position for removing a plug of earth from the hole being excavated.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new single handle post hole digger for excavating a constant diameter shaft in the ground for setting fence posts and the like.

It is another object of the present invention to provide a new single handle post hole digger which may be easily and efficiently manufactured and marketed.

It is a further object of the present invention to provide a new single handle post hole digger which is of a durable and reliable construction.

An even further object of the present invention is to provide a new single handle post hole digger which is susceptible of a low cost of manufacture with regard to both materials and labor, and which accordingly is then susceptible of low prices of sale to the consuming public, thereby making such single handle post hole diggers economically available to the buying public.

Still yet another object of the present invention is to provide a new single handle post hole digger which provides in the apparatuses and methods of the prior art some of the advantages thereof, while simultaneously overcoming some of the disadvantages normally associated therewith.

Still yet another object of the present invention is to provide a new single handle post hole digger that is easier to use than conventional double handle post hole diggers.

Yet another object of the present invention is to provide a new single handle post hole digger that positively grips a plug of soil being removed making it usable in all types of soil without requiring water to be added.

Even still another object of the present invention is to provide a new single handle post hole digger that provides a horizontal lifting handle not found in conventional post hole diggers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
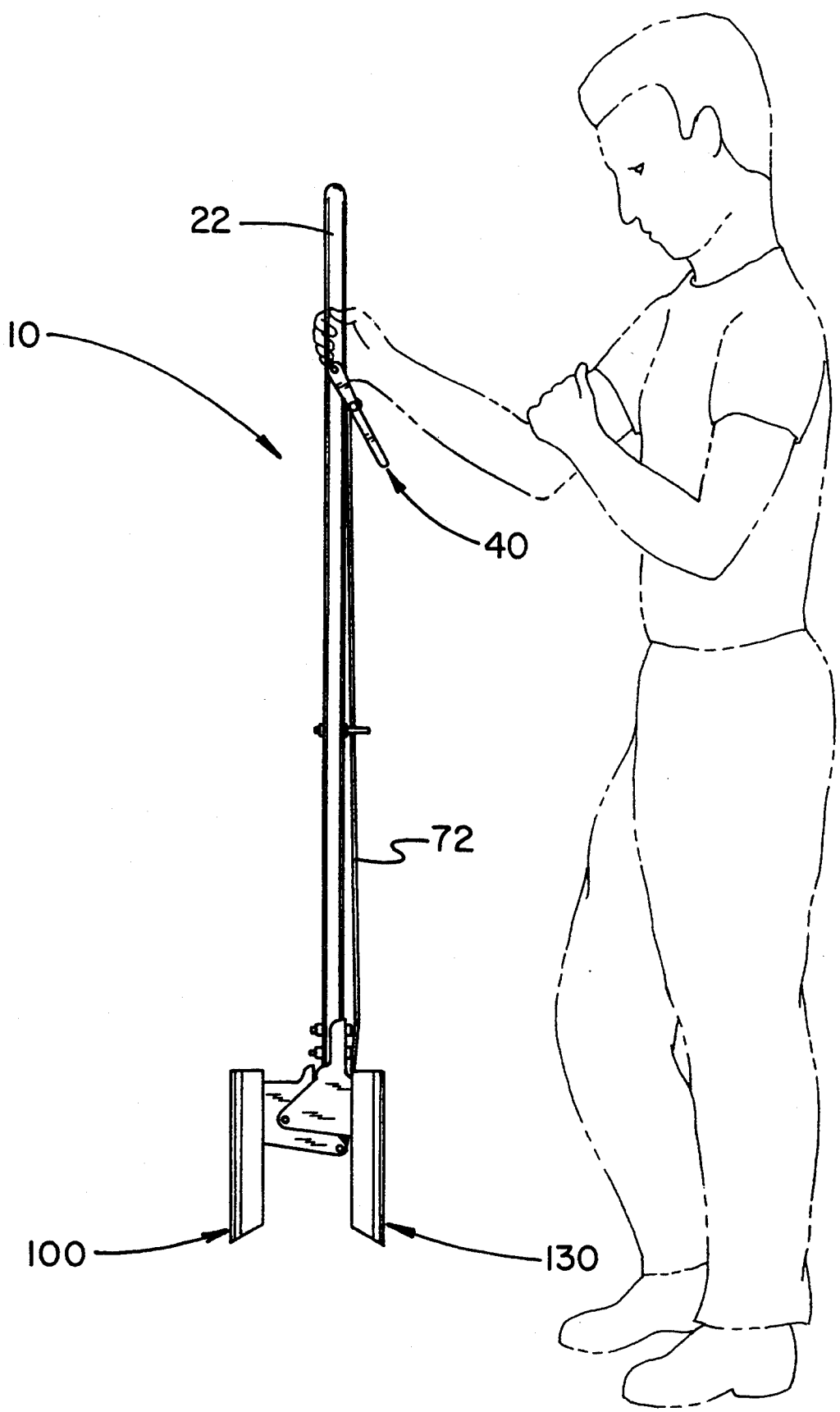
FIG. 1 is a side elevational view of the preferred embodiment of the single handle post hole digger showing its manner of use.
Figures 2, 3:
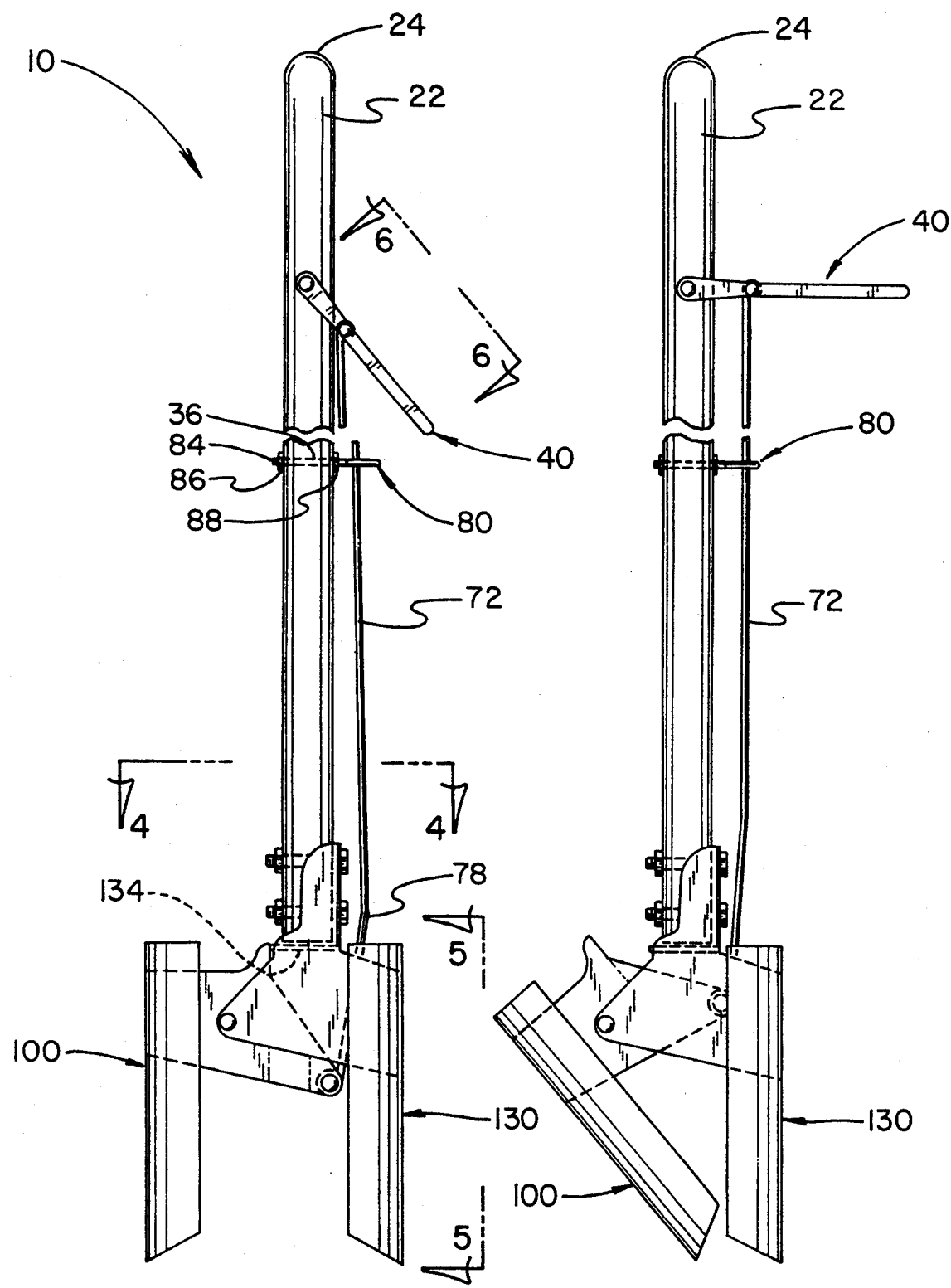
FIG. 2 is a side elevational view of the invention of FIG. 1 shown in the earth piercing position.
FIG. 3 is a side elevational view of the invention of FIG. 2 shown in the earth removing position.
Figure 4:
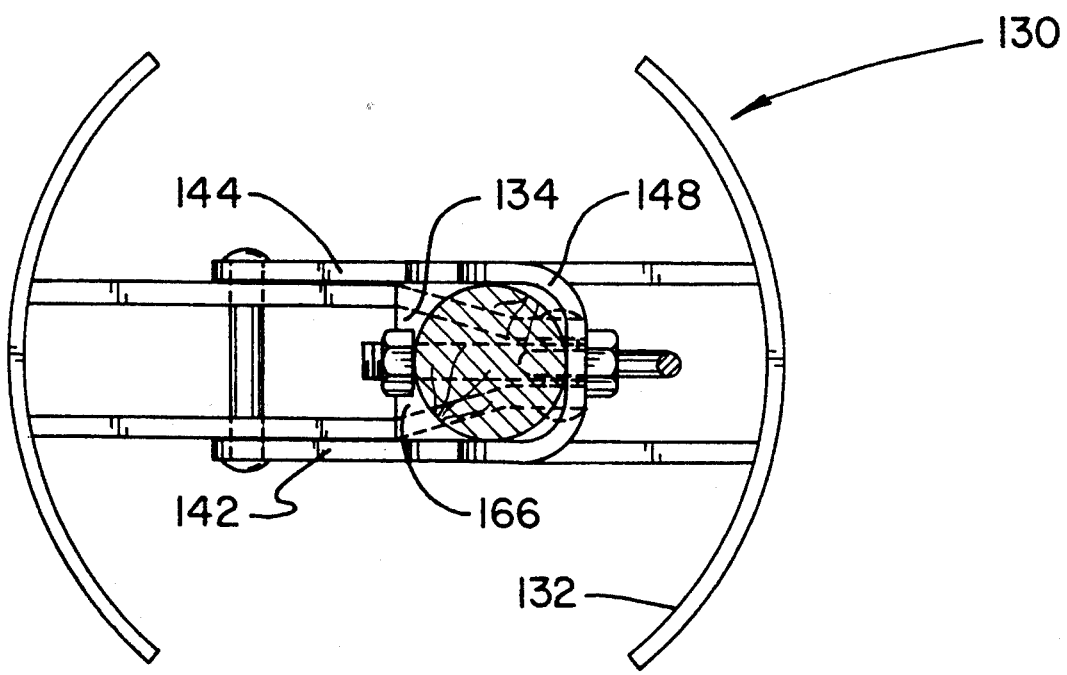
FIG. 4 is a sectional view of the invention of FIG. 2 taken along the line 4—4.
Figure 5:
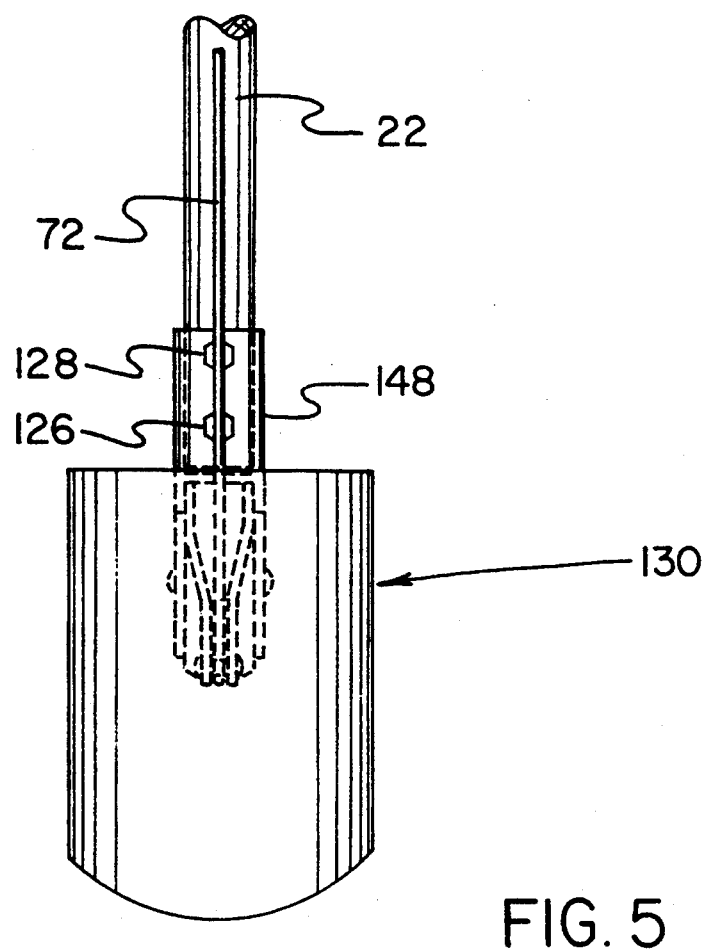
FIG. 5 is a partial rear elevational view of the invention of FIG. 2 showing the stationary shovel blade, the control rod, and part of the gripping handle.
Figure 6:
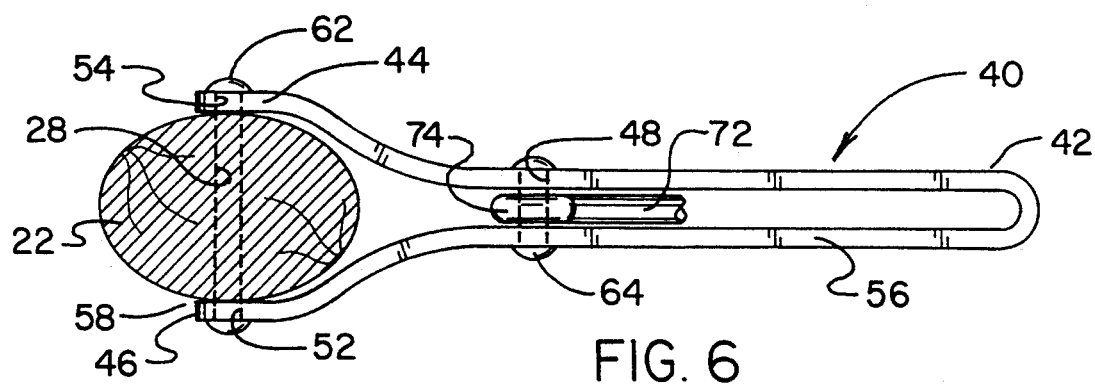
FIG. 6 is a sectional view of the invention of FIG. 2 taken along the line 6—6 and showing the manner of control rod attachment to the actuator lever.
Figure 7:
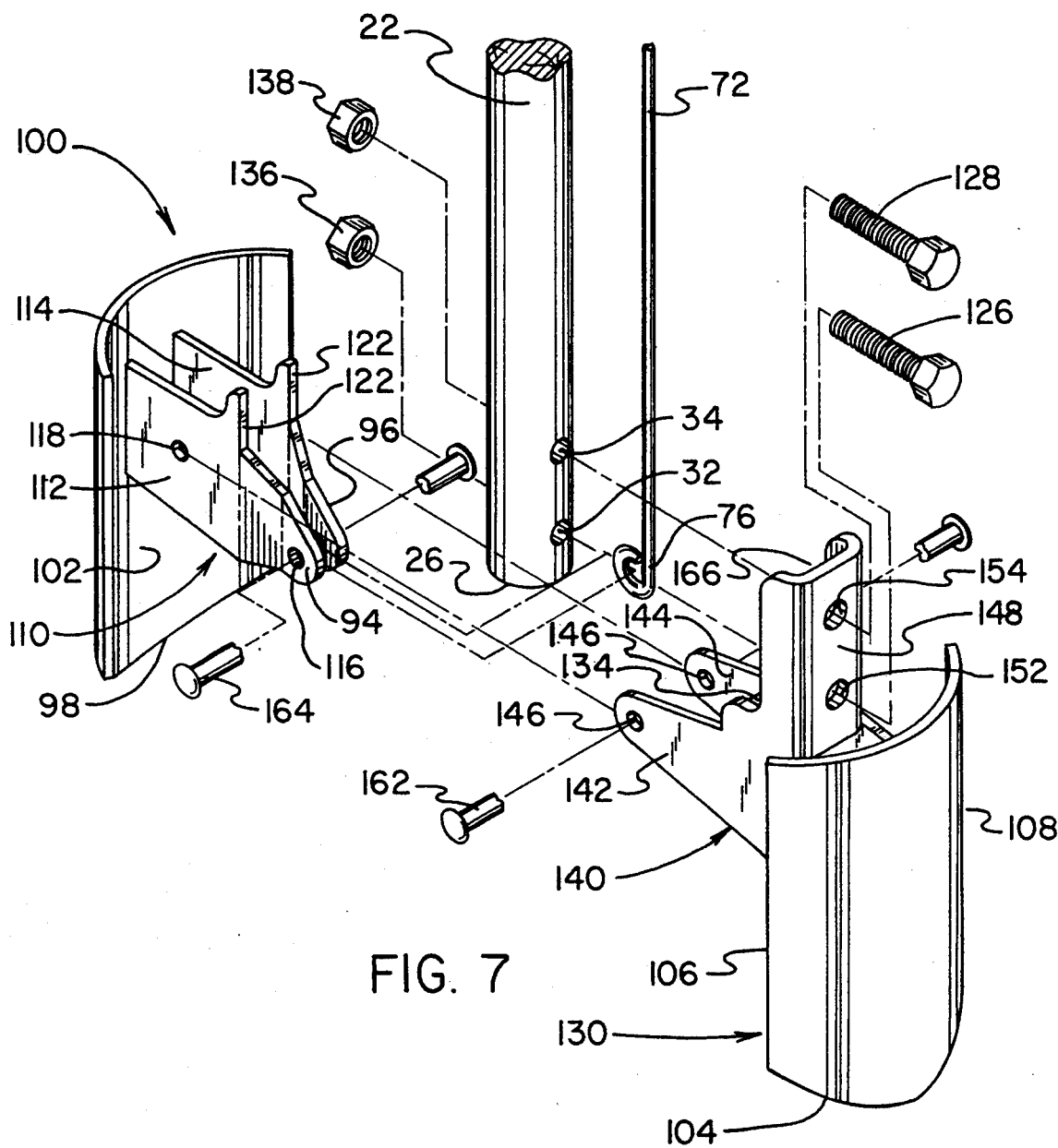
FIG. 7 is a partial exploded view of the present invention showing the relationship of the component parts of the lower portion thereof.

With reference now to the drawings, and in particular to FIG. 1 thereof, a new single handle post hole digger embodying the principles and concepts of the present invention and generally designated by the reference numeral 10 will be described.

From an overview standpoint, the single handle post hole digger is adapted for use for excavating a constant diameter shaft in the ground for setting fence posts and the like. See FIG. 1.

With reference now to FIGS. 1-7 and more specifically, it will be noted that a single handle post hole digger 10 is shown. The single handle post hole digger 10 comprises a stationary steel shovel blade 130 having an arcuate cross section, a cutting edge 104 formed on a lower end thereof, and straight side edges 106 and 108. The stationary blade 130 also has a connecting bracket 140 with an upwardly opening integrally formed socket 148 fixedly attached to an interior side 132 thereof, the socket 148 having a wall with a longitudinal opening 146 extending the length thereof. The socket 148 also has a solid bottom with an exposed edge portion at the wall opening defining a first abutment 134. The socket 148 is eccentrically positioned relative to the arc of the blade 130.

The connecting bracket 140 further has a pair of integrally formed parallel laterally spaced apart support arms 142 and 144 projecting therefrom. Each support arm has a lateral hole 146 formed proximal a free end thereof, each hole 146 aligning with the hole through the corresponding support arm 142 (or 144).

A movable steel shovel blade 100 has a shape and dimension essentially corresponding to the shape and dimension of the stationary blade 130. The movable blade 100 has an earth piercing position wherein the movable blade lies in spaced parallel facing relationship to the stationary blade 130 such that the extended arcs of the blades describe a cylinder. The movable blade 100 also has an earth removing position wherein the lower edge 98 of the movable blade is angled inwardly toward the stationary blade 130 to define a scoop.

The movable blade 100 additionally has a pair of parallel laterally spaced apart pivot arms 112 and 114 projecting from an interior side 102 thereof, each pivot arm 112 and 114 lying adjacent a connecting bracket support arm 142 and 144. Each pivot arm 112 and 114 has a lateral pivot hole 118 therethrough aligning with the hole 146 through the adjacent support arm 142 and 144. Each pivot arm 112 and 114 further has an integrally formed lever arm 94 and 96 projecting longitudinally therefrom, each lever arm having a lateral connecting hole 116 formed proximal a free end thereof. The connecting holes 116 have a connecting pin 164 extending therethrough, the connecting pin being secured with a swage on both ends thereof.

Each pivot arm 112 and 114 additionally has an integrally formed upwardly extending protrusion thereon defining, in combination, a second abutment 122. The second abutment 122 contacts the first abutment 134 when the shovel blades 100 and 130 are in the earth piercing position whereby establishing optimal blade alignment for earth piercing and simultaneously adding rigidity to the movable blade 100 during an earth piercing operation.

A pivot pin 162 extends through the holes 146 of the support arms 142 and 144. The pivot pin 162 also extends through the pivot holes 118 of the pivot arms 112 and 114 whereby pivotally connecting the movable shovel blade 100 to the stationary shovel blade 130 such to permit the blades to move between the earth piercing and earth removing positions. The pivot pin 162 is secured with a swage on both ends thereof.

An elongated wood or fiberglass gripping handle 22 has first and second ends 24 and 26. The second ends 26 of the gripping handle fixedly engages the socket 148 such that the blades 100 and 130 form a longitudinal extension of the handle 22. A pair of bolts 126 and 128 extend through two spaced apart holes 152 and 154 formed in the socket 148. The bolts 126 and 128 also extend through a pair of spaced apart holes 32 and 34 proximal the second end 26 of the gripping handle 22 whereby securing the handle 22 within the socket. A pair of nuts 136 and 138 threadedly engage the bolts 126 and 128 to secure the bolts in place. The handle 22 is eccentrically positioned proximal the stationary blade 130 within the circle described by the extended arcs of the blades 100 and 130 whereby the stationary blade 130 will bear the majority of stress resulting from the earth piercing operation.

Blade control means pivots the movable blade 100 between the earth piercing and earth removing positions. The blade control means comprises an actuator lever 40 constructed of an elongated metal strip 56 folded laterally back against itself intermediate the ends thereof to form a handle having a first bifurcated end 58 and a second gripping end 42. Each prong 44 and 46 of the bifurcated end 58 has a hole 54 and 52 proximal the end thereof. The gripping handle 22 has a lateral hole 28 therethrough proximal the first end 24 thereof.

The prongs 44 and 46 straddle the gripping handle 22 such that the prong holes 54 and 52 align with the gripping handle hole 28. A first pin 62 extends through the prong holes 54 and 52 and also extends through the gripping handle hole 28 whereby pivotally connecting the actuator lever 40 to the gripping handle 22. The first pin 62 is secured with a swage formed on both ends thereof. The actuator lever additionally has a lateral hole 48 intermediate the first and second ends 58 and 42 thereof.

A control rod 72 has first and second looped ends 74 and 76 and a slight offset bend 78 proximal the second end 76 thereof. A second pin 64 extends through the lateral hole 48 of the actuator lever 40 and also extends through the loop formed on the first end 74 of the control rod 72 whereby pivotally connecting the first end of the control rod to the actuator lever. The second pin 64 is secured with a swage formed on both ends thereof.

The loop at the second end 76 of the control rod encircles the connecting pin 164 extending through the lever arms 94 and 96 of the movable shovel blade 100 whereby pivotally connecting the second end 76 of the control rod 72 to the movable shovel blade 100. The offset bend 78 of the control rod 72 prevents the exposed heads of the bolts 126 and 128 from interfering with control rod 72 movement. The control rod 72 is held in position alongside the gripping handle 22 with a control rod 72 encircling eye bolt 80 which extends through a lateral hole 36 through the gripping handle 22 intermediate the actuator lever 40 and the second end 26 of the handle. The eye bolt 80 is secured with a nut 86 and 88 positioned on either side of the gripping handle 22, the nuts 86 and 88 being threadedly engaged with the eye bolt shank 84.

In operation, pushing the actuator lever 40 downwardly toward the blades 100 and 130 causes the movable blade 100 to pivot parallel to the stationary blade 130 to the earth piercing position. The blades of the single handle post hole digger 10 are now plunged or "thrown" into the earth at the spot where the post is to be set. The actuator lever 40 is pulled upwardly toward the first end 24 of the gripping handle 22 which causes the lower end 98 of the now embedded movable blade 100 to pivot inwardly toward the also embedded stationary blade 130 thereby trapping a plug of earth between the blades.

The plug of earth is removed by pulling upwardly on the gripping handle 22, a task made easier if the now horizontally positioned actuator lever 40 is also gripped. The plug is released from the blades by again pushing the actuator lever 40 downwardly to open the blades. The above sequence is repeated until the hole is sufficiently deep.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A single handle post hole digger for excavating a constant diameter shaft in the ground for setting fence posts and the like, the single handle post hole digger comprising:

a stationary replaceable steel shovel blade having an arcuate cross section, a cutting edge formed on the lower end thereof, and straight side edges, the stationary blade also having a connecting bracket with an upwardly opening integrally formed socket fixedly attached to an interior side thereof, the socket having a wall with a longitudinal opening extending the length thereof, the socket also having a solid bottom with an exposed edge portion at the wall opening defining a first abutment, the socket being eccentrically positioned relative to the arc of the blade, the connecting bracket further having a pair of integrally formed parallel laterally spaced apart support arms projecting therefrom, each support arm having a lateral hole formed proximal a free end thereof, each hole aligning with the hole through the corresponding support arm;

a movable replaceable steel shovel blade having a shape and dimension essentially corresponding to the shape and dimension of the stationary blade, the movable blade having an earth piercing position wherein the movable blade lies in spaced parallel facing relationship to the stationary blade such that the extended arcs of the blades describe a cylinder, the movable blade also having an earth removing position wherein the lower edge of the movable blade is angled inwardly toward the stationary blade to define a scoop, the movable blade additionally having a pair of parallel laterally spaced apart pivot arms projecting form an interior side thereof, each pivot arm lying adjacent a connecting bracket support arm, each pivot arm having a lateral pivot hole therethrough aligning with the hole through the adjacent support arm, each pivot arm further having an integrally formed lever arm projecting longitudinally therefrom, each lever arm having a lateral connecting hole formed proximal a free end thereof, the connecting holes having a connecting pin extending therethrough, the connecting pin being secured with a swage on both ends thereof, each pivot arm additionally having an integrally formed upwardly extending protrusion thereon defining in combination a second abutment, the second abutment contacting the first abutment when the shovel blades are in the earth piercing position whereby establishing optimal blade alignment for earth piercing and simultaneously adding rigidity to the movable blade during an earth piercing operation;

a pivot pin extending through the holes of the support arms, the pivot pin also extending through the pivot holes of the pivot arms whereby pivotally connecting the movable shovel blade to the stationary shovel blade such to permit the blades to move between the earth piercing and earth removing positions, the pivot pin being secured with a swage on both ends thereof;

an elongated fiberglass gripping handle having first and second ends, the second end of the gripping handle fixedly engaging the socket such that the blades form a longitudinal extension of the handle, the handle being eccentrically positioned proximal the stationary blade within the circle described by the extended arcs of the blades whereby the stationary blade will bear the majority of stress resulting from the earth piercing operation; and blade control means for pivoting the movable blade between the earth piercing and earth removing positions, the blade control means comprising an actuator lever formed of an elongated metal strip folded laterally back against itself intermediate to form a handle having a bifurcated first end and a second gripping end and with the first end thereof pivotally connected to the gripping handle proximal the first end thereof such that the actuator lever moves through an arc lying on a longitudinal plane of the handle, an encircling eye bolt coupled to the gripping handle intermediate the actuator lever and the second end of the gripping handle, and a control rod disposed within the eye bolt having a looped first end, a looped second end, and a bend offset from the second end, the control rod pivotally connected at the first end thereof to the actuator lever intermediate the first end and second end thereof, the control rod being pivotally connected at the second end thereof to the connecting pin of the movable blade whereby pushing the actuator lever downwardly, toward the blades causes the movable blade to pivot parallel to the stationary blade in the earth piercing position whereas pulling the actuator lever upwardly toward the first end of the gripping handle causes the lower end of the movable blade to pivot inward toward the stationary blade in the earth removing position for removing a plug of earth from the hole being excavated.

* * * * *